(12) United States Patent
Tucker et al.

(10) Patent No.: US 11,301,434 B2
(45) Date of Patent: Apr. 12, 2022

(54) SYSTEM AND METHOD FOR MANAGING A DATA STORE

(71) Applicant: Pixit Media Limited, Leatherhead (GB)

(72) Inventors: Jeremy Tucker, Leatherhead (GB); John Leedham, Leatherhead (GB); Christopher Oates, Leatherhead (GB)

(73) Assignee: PIXIT MEDIA LIMITED, Leatherhead (GB)

( * ) Notice: Subject to any disclaimer, the term of this patent is extended or adjusted under 35 U.S.C. 154(b) by 128 days.

(21) Appl. No.: 16/496,377

(22) PCT Filed: Mar. 23, 2018

(86) PCT No.: PCT/GB2018/050767
§ 371 (c)(1),
(2) Date: Sep. 20, 2019

(87) PCT Pub. No.: WO2018/172790
PCT Pub. Date: Sep. 27, 2018

(65) Prior Publication Data
US 2021/0109901 A1    Apr. 15, 2021

(30) Foreign Application Priority Data
Mar. 24, 2017  (GB) .................................... 1704710

(51) Int. Cl.
*G06F 16/18* (2019.01)
*G06F 16/182* (2019.01)
(Continued)

(52) U.S. Cl.
CPC .......... *G06F 16/183* (2019.01); *G06F 9/4881* (2013.01); *G06F 16/1734* (2019.01); *G06F 16/1858* (2019.01); *H04L 67/142* (2013.01)

(58) Field of Classification Search
CPC .. G06F 16/183; G06F 9/4881; G06F 16/1734; G06F 16/1858; G06F 16/182; H04L 67/142
See application file for complete search history.

(56) References Cited

U.S. PATENT DOCUMENTS

| | | | |
|---|---|---|---|
| 7,197,547 | B1 | 3/2007 | Miller et al. |
| 2003/0046335 | A1 | 3/2003 | Doyle et al. |

(Continued)

FOREIGN PATENT DOCUMENTS

| | | |
|---|---|---|
| CN | 104111983 A | 10/2014 |
| JP | 2011-258097 A | 12/2011 |
| JP | 2011258097 A * | 12/2011 |

OTHER PUBLICATIONS

International Search Report and Written Opinion dated May 8, 2018, from application No. PCT/GB2018/050767.

(Continued)

*Primary Examiner* — Pierre M Vital
*Assistant Examiner* — Andrew N Ho
(74) *Attorney, Agent, or Firm* — Foley & Lardner LLP

(57) ABSTRACT

A data management system (1) for managing a data store (6), the system comprising: a central control module (2) configured to receive a request and generate a task using the request; a state store module (26) coupled to the central control module (2) and configured to store the task generated by the central control module (2), wherein the state store module (26) is further configured to store state information indicative of a state of the data store (6) and configured to output the stored task in response to the state information; and an enactor module (31) which is configured to action the task output from the state store module (26) by generating an enactor output command that at least partly corresponds to the task which, when communicated to the data store (6), (Continued)

Figure 1:
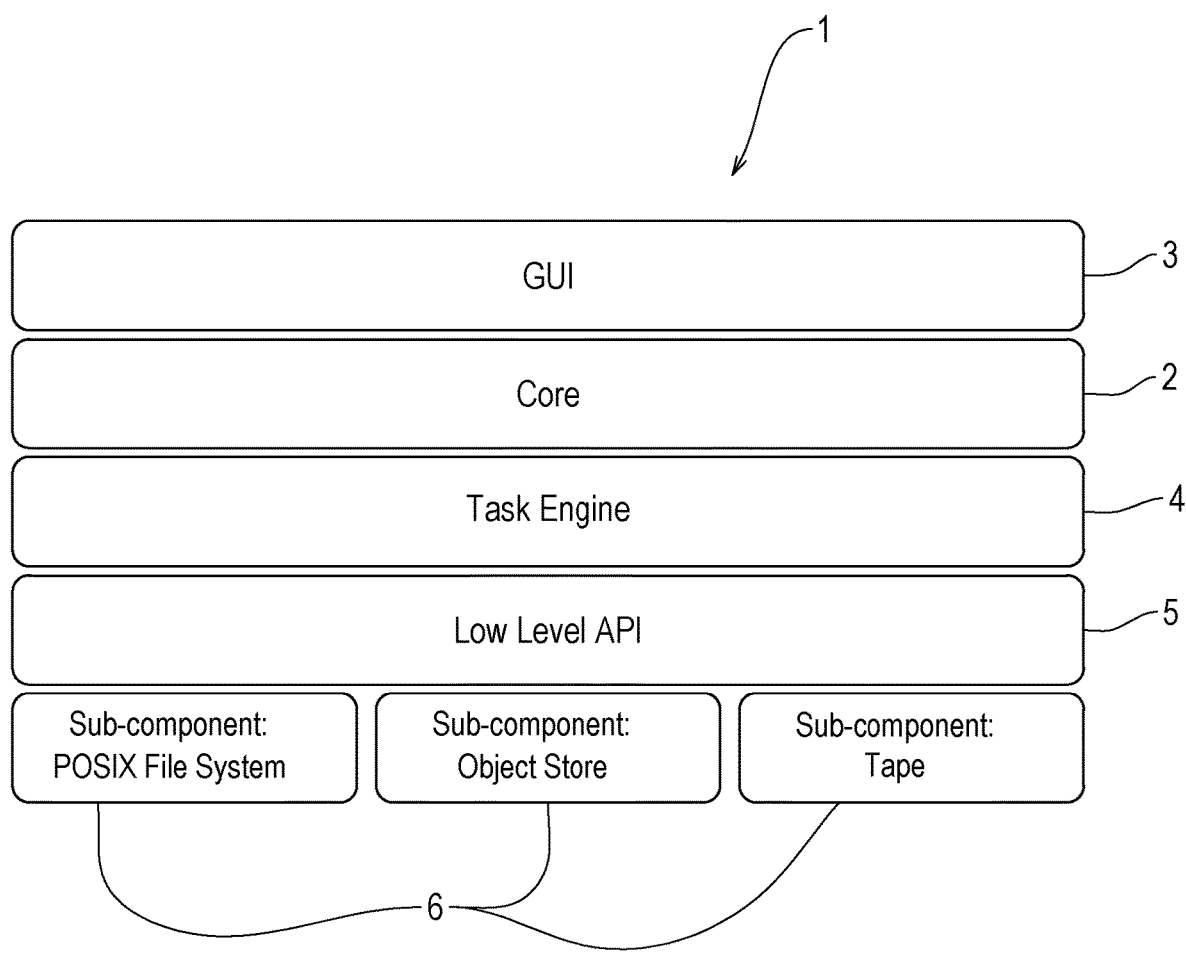

causes the data store (6) to perform an action related to data stored in the data store (6).

20 Claims, 13 Drawing Sheets

(51) Int. Cl.
*G06F 16/17* (2019.01)
*G06F 9/48* (2006.01)
*H04L 67/142* (2022.01)

(56) References Cited

U.S. PATENT DOCUMENTS

| | | | | |
|---|---|---|---|---|
| 2008/0244584 | A1* | 10/2008 | Smith | G06F 9/4881 |
| | | | | 718/102 |
| 2009/0083241 | A1* | 3/2009 | Jones | H04L 67/02 |
| 2009/0254774 | A1* | 10/2009 | Chamdani | G06F 9/4881 |
| | | | | 707/999.005 |
| 2010/0138485 | A1* | 6/2010 | Chow | H04L 67/42 |
| | | | | 709/203 |
| 2012/0158882 | A1 | 6/2012 | Oehme et al. | |
| 2015/0263900 | A1 | 9/2015 | Polyakov et al. | |

OTHER PUBLICATIONS

Johnson A. Carrie: "File and Object Storage for Dummies", Jan. 1, 2016, XP055471311.
European Office Action dated Aug. 23, 2021, from application No. 18715092.5.

\* cited by examiner

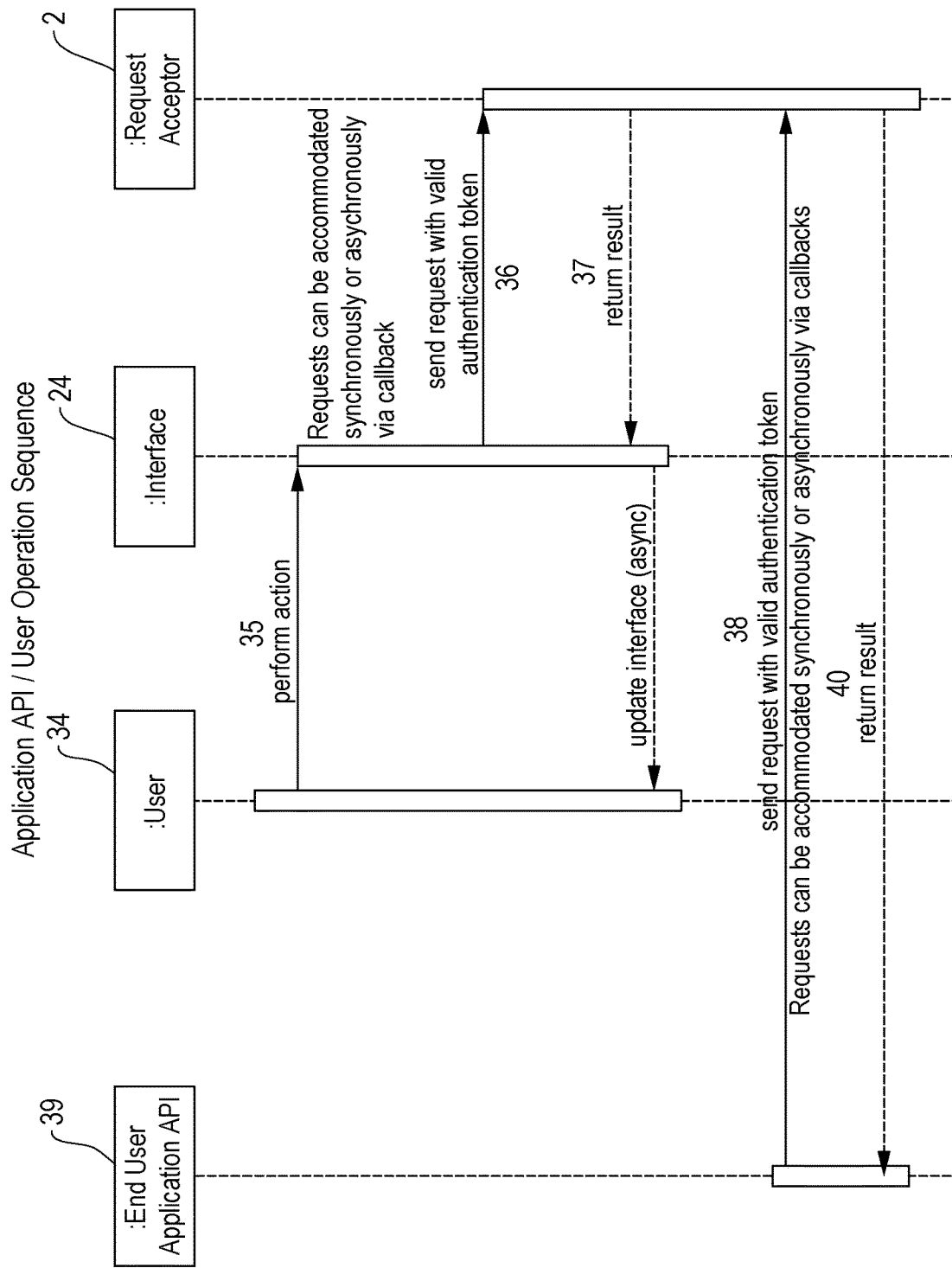

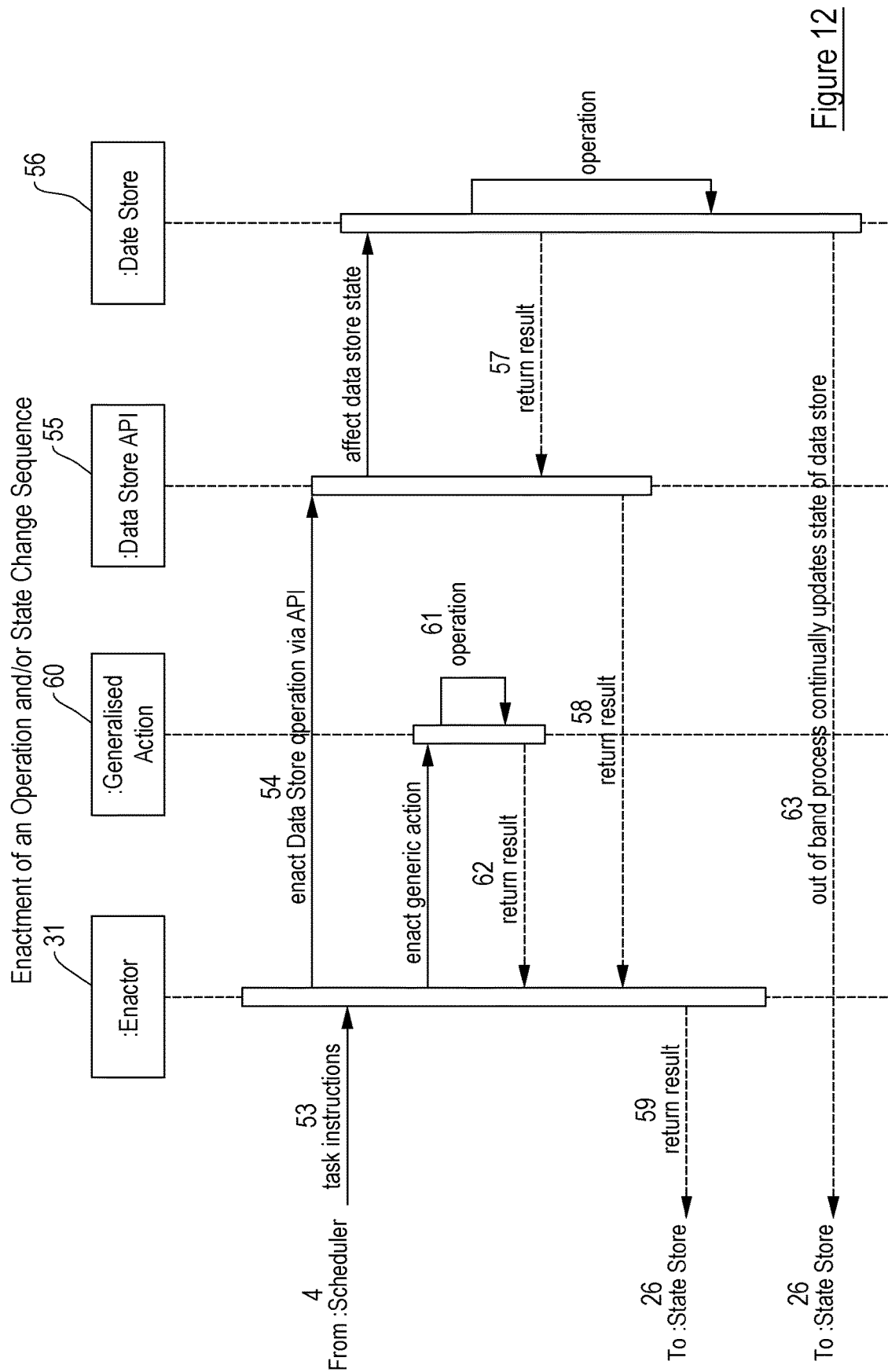

SYSTEM AND METHOD FOR MANAGING A DATA STORE

This application is a national stage application under 35 U.S.C. § 371 of International Application No. PCT/GB2018/050767, filed on Mar. 23, 2018, which claims the benefit of United Kingdom Application No. 1704710.1, filed on Mar. 24, 2017, both of each of which are incorporated by reference herein in their entirety.

The present invention relates to a data management system and a method for managing data stored in a data store.

A modern data storage repository is typically required to store large amounts of data and provide reliable and quick access to the data. For example, a media storage repository is required to store and index a large number of media files that often have very large file sizes. In another example in the field of Big Data, large amounts of data must be stored in a repository and the repository is required to provide quick and reliable access to the data for analysis.

While conventional data storage systems allow a large amount of data to be stored, the constraints of conventional file systems can make it difficult for users to manage the data. One conventional file system that is commonly used in high-performance data storage systems is IBM Spectrum Scale™ that was developed by IBM™ and previously known as General Parallel File System (GPFS). The following description will refer to this conventional file system as GPFS. GPFS provides reliable and high performance access to data but an in depth knowledge of GPFS commands or a proprietary interface is typically required for users to manage data stored in a GPFS file system.

In the field of video production, many large video files must be stored and accessed quickly during the editing process. These large video files are typically data files that store 2D or 3D ultra-high-definition video in SD, HD, 2K, 4K, UHD, 6K, 8K or higher resolutions. While there are conventional systems that provide high-performance access to video data, they can be difficult to manage and difficult scale out to provide additional flexibility and storage.

There is a need for a scalable high-performance data management system that is easy to manage.

The present invention seeks to provide an improved data management system and method.

According to one aspect of the present invention, there is provided a data management system for managing a data store, the system comprising: a central control module configured to receive a request and generate a task using the request; a state store module coupled to the central control module and configured to store the task generated by the central control module, wherein the state store module is further configured to store state information indicative of a state of the data store and configured to output the stored task in response to the state information; and an enactor module which is configured to action the task output from the state store module by generating an enactor output command that at least partly corresponds to the task which, when communicated to the data store, causes the data store to perform an action related to data stored in the data store.

Preferably, the central control module is configured for stateless operation.

Conveniently, the central control module is a Representational State Transfer (REST) server.

Advantageously, the central control module is configured to receive the request in a REST format and process the request to generate the task.

Preferably, the REST format is a semantic REST format.

Conveniently, the central control module is configured to receive at least part of the state information stored by the state store module.

Advantageously, the system further comprises: a scheduler module configured to cause the enactor module to action the task at a predetermined time.

In some embodiments, the predetermined time is substantially immediately.

In some embodiments, the predetermined time is a predetermined time in the future.

Preferably, the scheduler module is configured to cause the enactor module to action a task repeatedly.

Conveniently, the scheduler module is configured to prioritise a plurality of tasks so that the tasks are actioned by the enactor module in a predetermined order.

Advantageously, the state store module is configured to store state information indicative of the state of the scheduler module.

Preferably, the system further comprises: a state monitoring module which is configured to monitor the state of at least the data store and provide state information indicative of the state of at least the data store to the state store module.

Conveniently, the system comprises a data store in the form of a data store server and the state monitoring module is configured for execution as a daemon.

Advantageously, the state monitoring module is configured for execution as a daemon on the data store server or on an additional server with access to the data store server or with access to a view of the data store server.

Preferably, the system further comprises: a data store which comprises a network-connected data store server.

Conveniently, the system further comprises: a data store which comprises a data store server that is coupled to the system via a Serial Attached SCSI (SAS) or Fibre-Channel (FC) interface.

Advantageously, the data store server is configured to store data using an IBM Spectrum Scale™ or General Parallel File System (GPFS).

Preferably, the enactor output command is an IBM Spectrum Scale™ or GPFS command.

Conveniently, the data store comprises a plurality of data store servers.

Advantageously, the system comprises: a data store which comprises one or more of a tape, a magneto-optical (MO) drive, a digital versatile disc (DVD), an object store, a database or a computer accessible data storage device.

Preferably, the data store is configured to store state information and configured to provide the state information to the state store module.

Conveniently, the system further comprises: a user interface module configured to receive an input from a user and configured to communicate the input as a request to the central control module.

Advantageously, the user interface module is configured to provide a visual output to a user which is indicative of the state of the data management system.

Preferably, the system further comprises: an authentication module which is configured to verify the authenticity of a user and allow a user to use the system if the user is authorised and prevent a user from using the system if the user is not authorised.

Conveniently, the authentication module is configured to use an OAuth protocol.

According to another aspect of the present invention, there is provided a distributed data management system comprising a plurality of data management systems, at least one of the plurality of data management systems being a data management system according to any one of claims 1-26 defined hereinafter.

Preferably, the plurality of data management systems are each configured to manage data stored in the same data store.

Conveniently, the central control module of each of the plurality of data management systems is configured to receive state information from the state store module of at least one of the other data management systems.

According to a further aspect of the present invention, there is provided a method of managing a data store, the method comprising: receiving a request at a central control module; generating at the central control module a task using the request; storing the generated task at a state store module which is coupled to the central control module; storing at the state store module state information indicative of a state of the data store; outputting the stored task from the state store module in response to the state information; and enacting the task using an enactor module by generating an enactor output command that at least partly corresponds to the task which, when communicated to the data store, causes the data store to perform an action on data stored in the data store.

Preferably, the central control module is configured for stateless operation.

Conveniently, the central control module is a Representational State Transfer (REST) server.

Advantageously, the method further comprises: receiving the request at the central control module in a REST format; and processing the request to generate the task.

Preferably, the REST format is a semantic REST format.

Conveniently, the method further comprises: receiving at the central control module at least part of the state information stored by the state store module.

Advantageously, the method further comprises: enacting the task at a predetermined time in response to an output from a scheduler module.

In some embodiments, the predetermined time is substantially immediately.

In some embodiments, the predetermined time is a predetermined time in the future.

Preferably, the method comprises enacting a task repeatedly.

Conveniently, the method comprises prioritising a plurality of tasks so that the tasks are actioned by the enactor module in a predetermined order.

Advantageously, the method comprises storing at the state store module state information indicative of the state of the scheduler module.

Preferably, the method further comprises: monitoring using a state monitoring module the state of at least the data store; and providing state information indicative of the state of at least the data store to the state store module.

Conveniently, the method comprises executing the state monitoring module as a daemon on a data store server or on an additional server with access to the data store server or with access to a view of the data store server.

Advantageously, the data store comprises a directly or network-connected data store server.

Preferably, the data store comprises a data store server that is coupled to the system via a Serial Attached SCSI (SAS) or Fibre-channel (FC) interface.

Conveniently, the data store server is configured to store data using an IBM Spectrum Scale™ or General Parallel File System (GPFS).

Advantageously, the enactor output command is an IBM Spectrum Scale™ or GPFS command.

Preferably, the data store comprises a plurality of data store servers.

Conveniently, the data store comprises one or more of a tape, a magneto-optical (MO) drive, a digital versatile disc (DVD), an object store, a database or a computer accessible data storage device.

Advantageously, the method comprises storing state store information at the data store; and providing the state information to the state store module.

Preferably, the method further comprises: receiving an input from a user at a user interface module; and communicating the input as a request to the central control module.

Conveniently, the method further comprises: using the user interface module to provide a visual output to a user which is indicative of the state of the data management system.

Advantageously, the method further comprises: using an authentication module to verify the authenticity of a user; allowing a user to use the method if the user is authorised; and preventing a user from using the method if the user is not authorised.

Preferably, the authentication module is configured to use an OAuth protocol.

Figure 2:
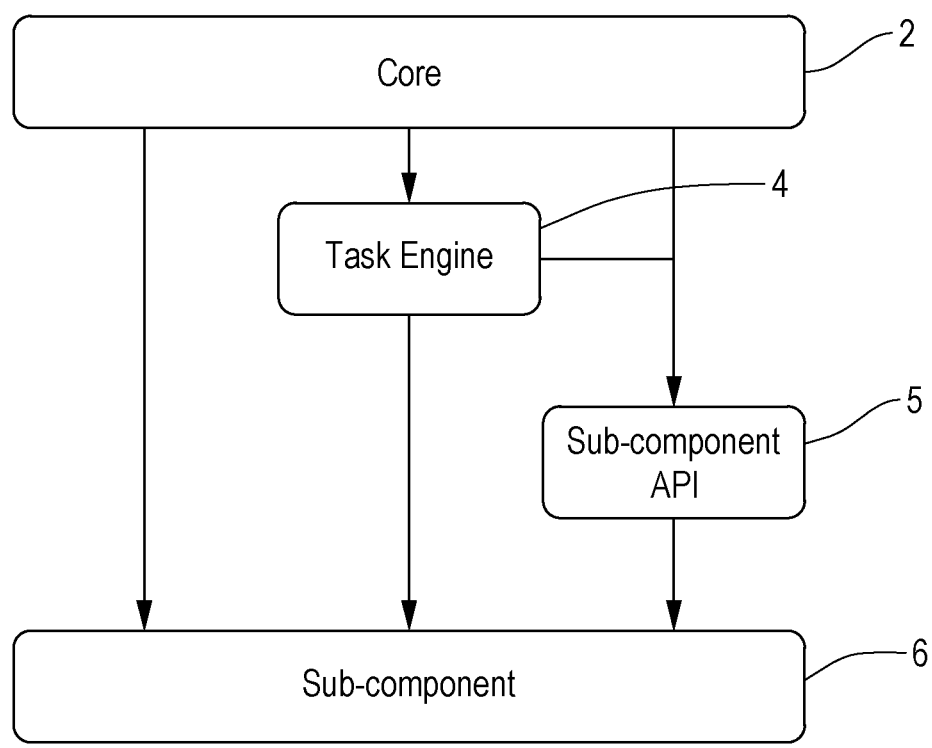
Figure 3:
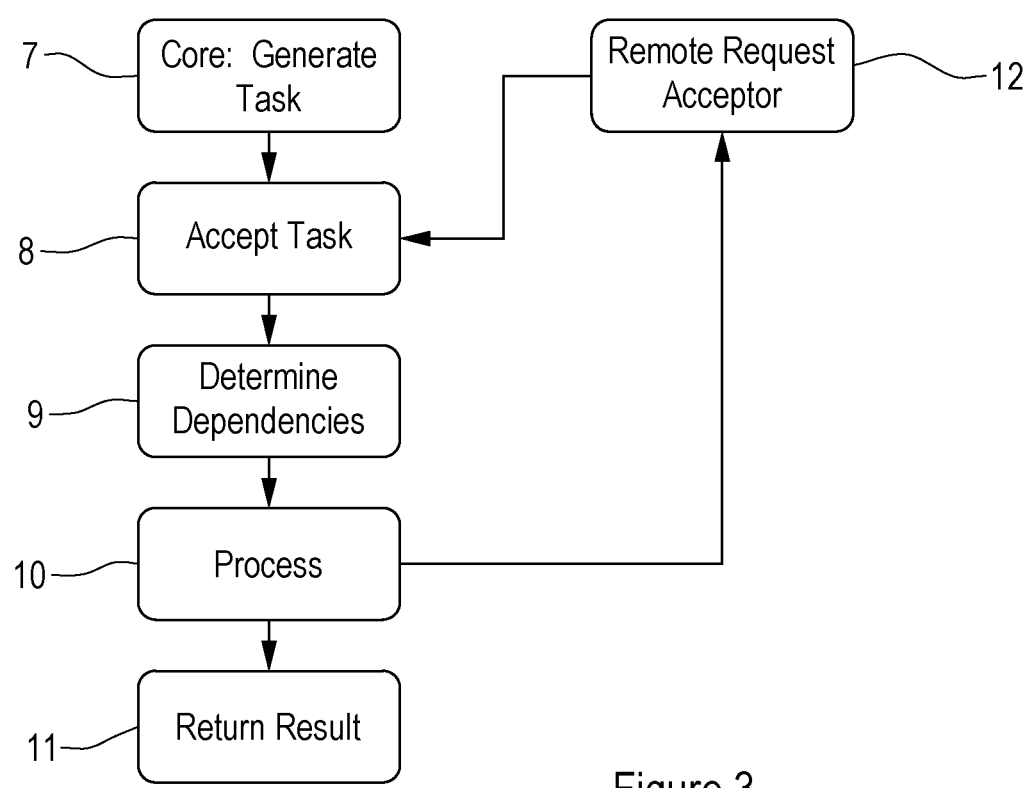
Figure 4:
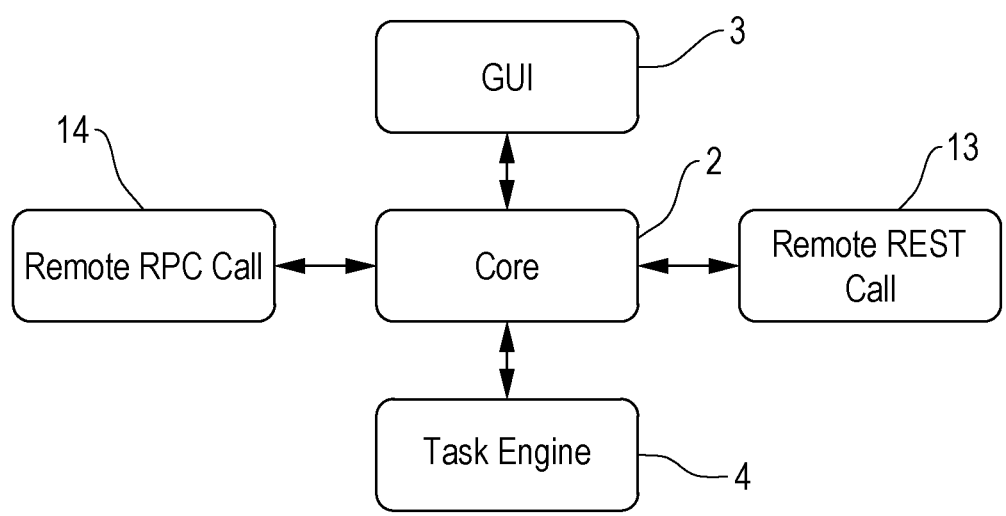
Figure 5:
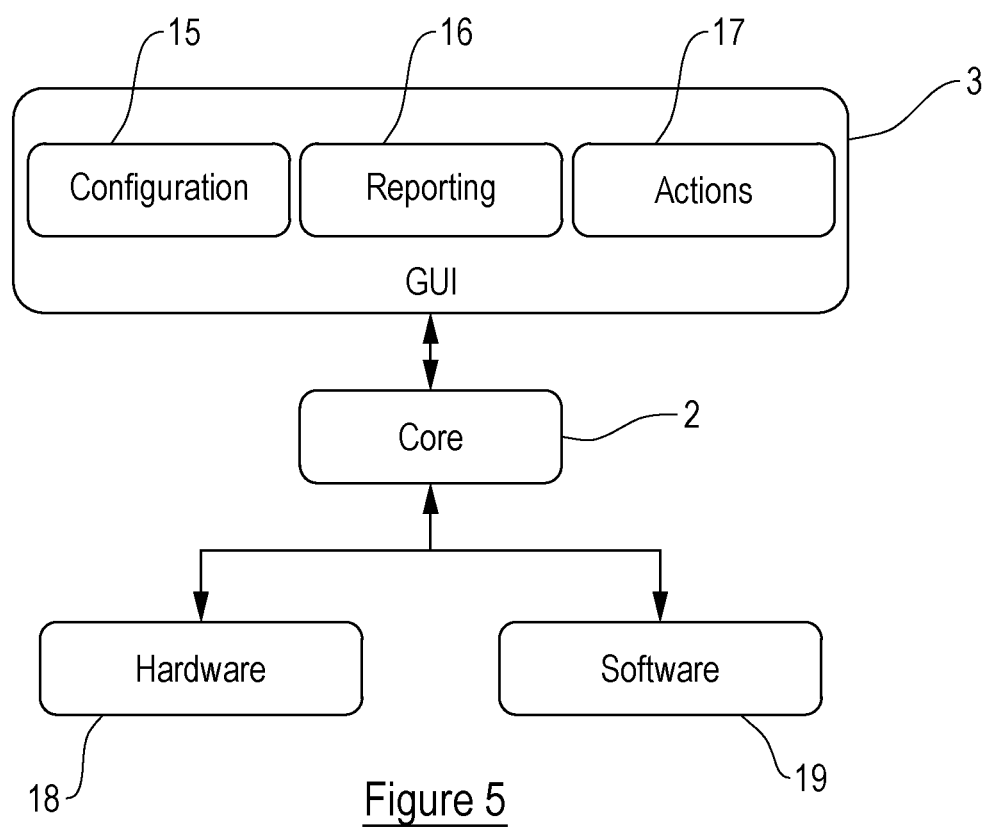
Figure 6:
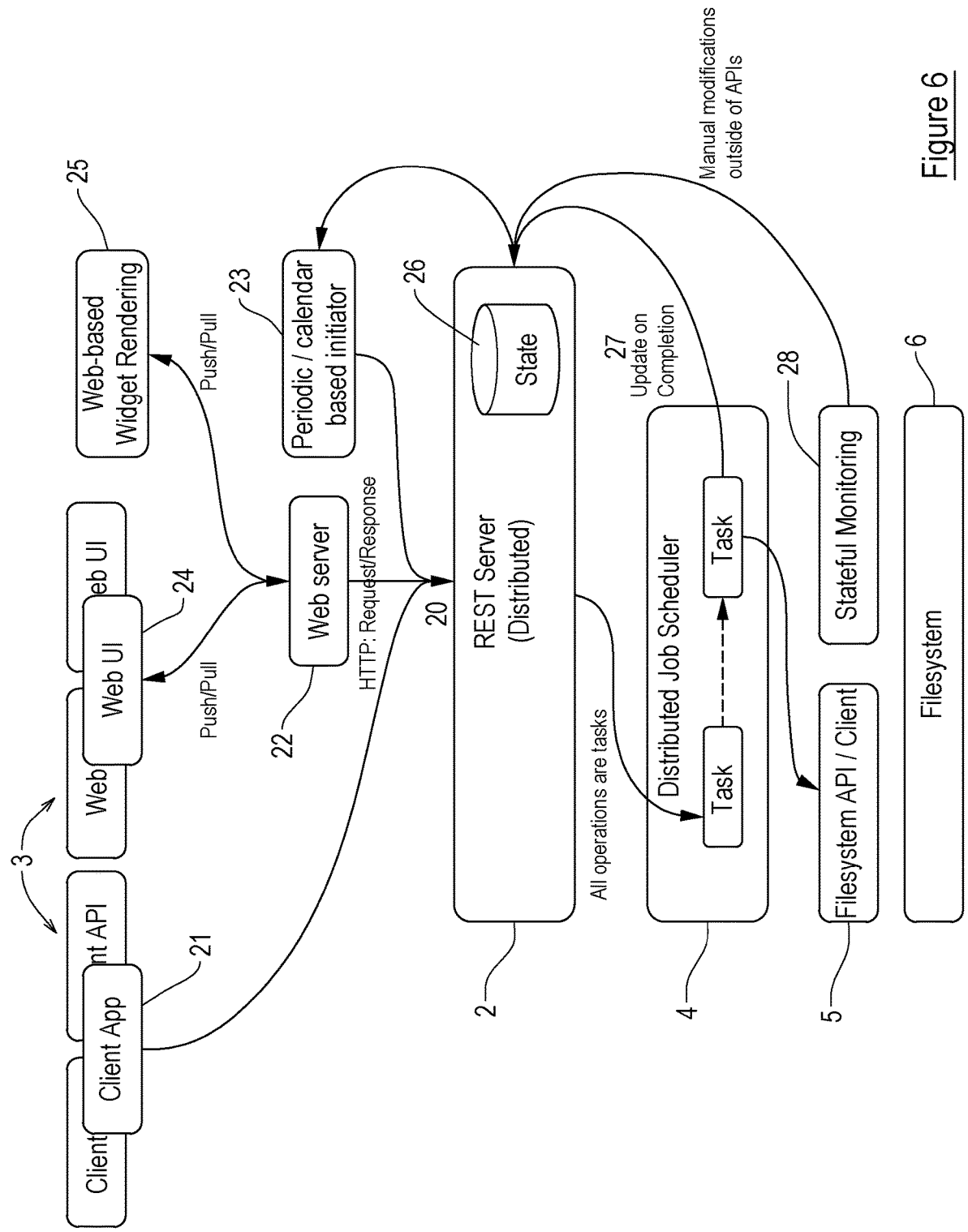
Figure 7:
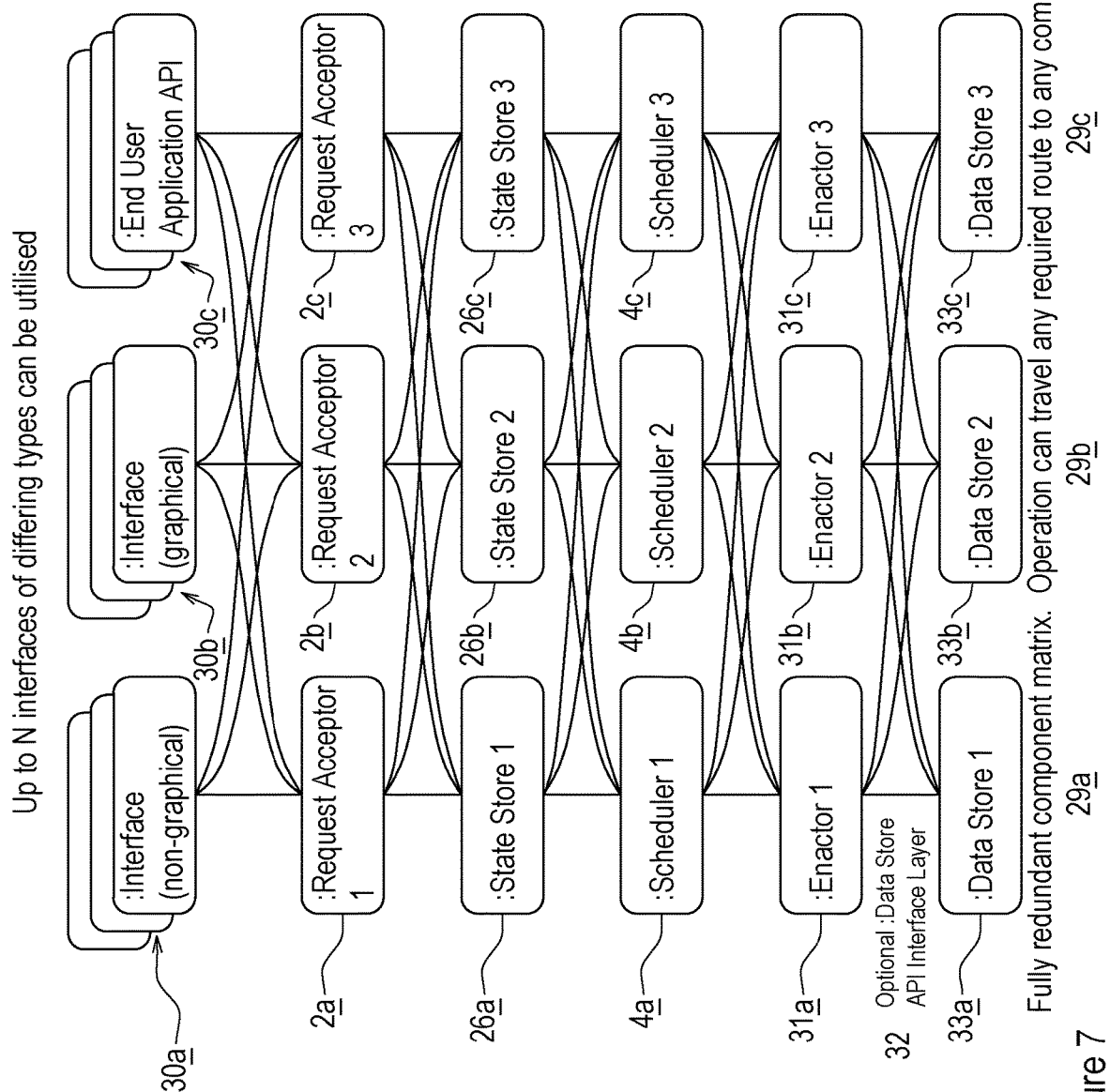
Figure 8:
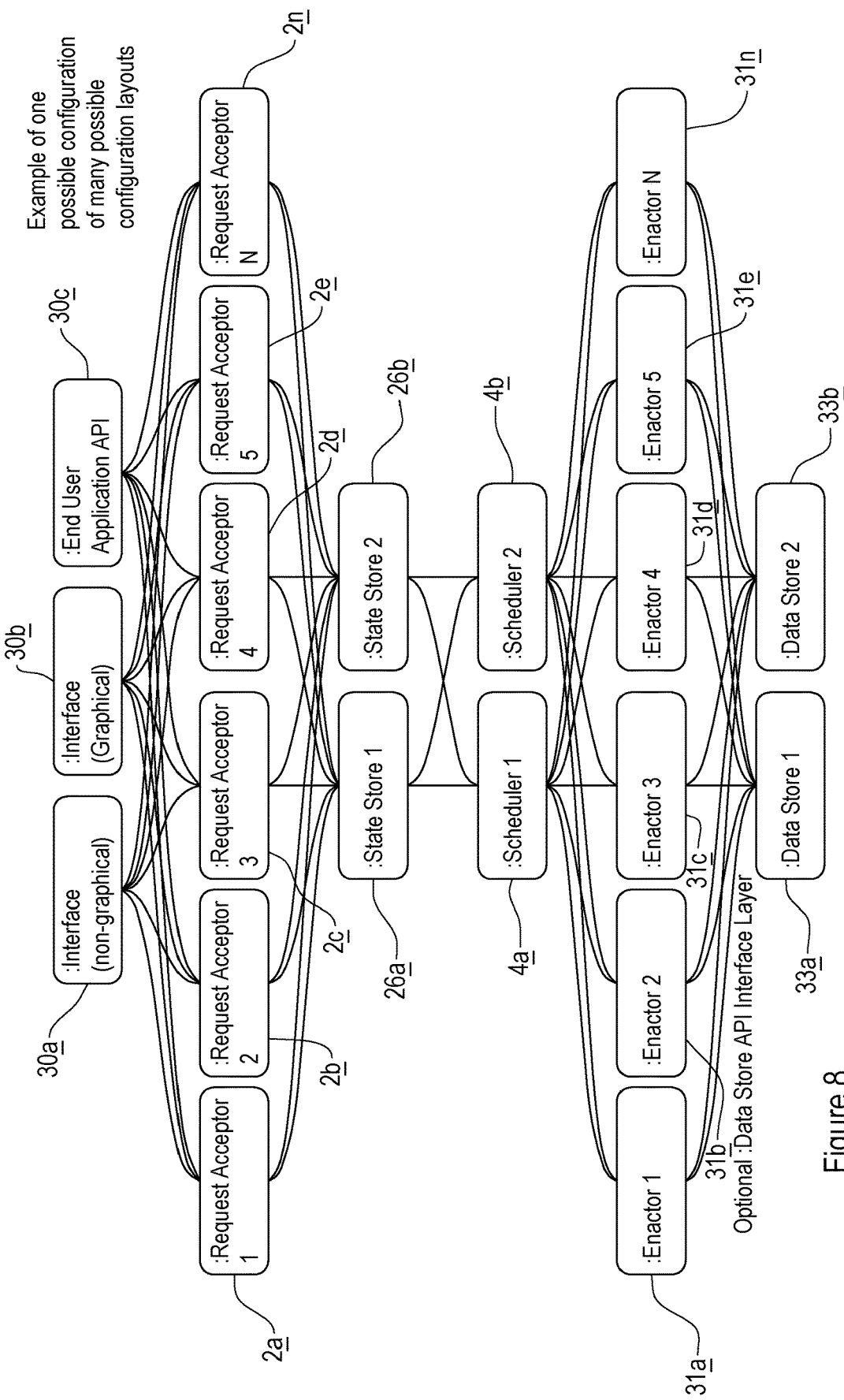
Figure 9A:
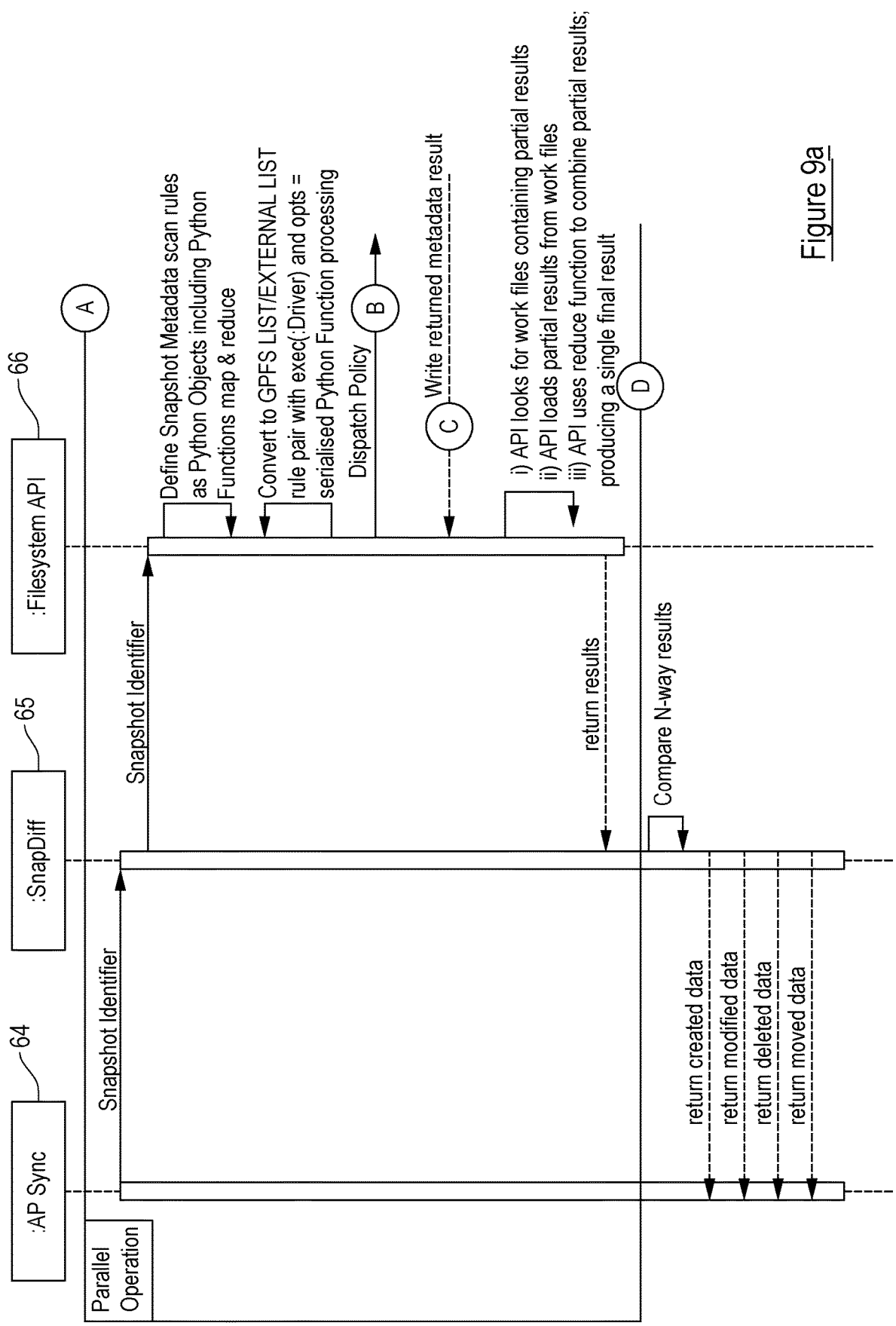
Figure 9B:
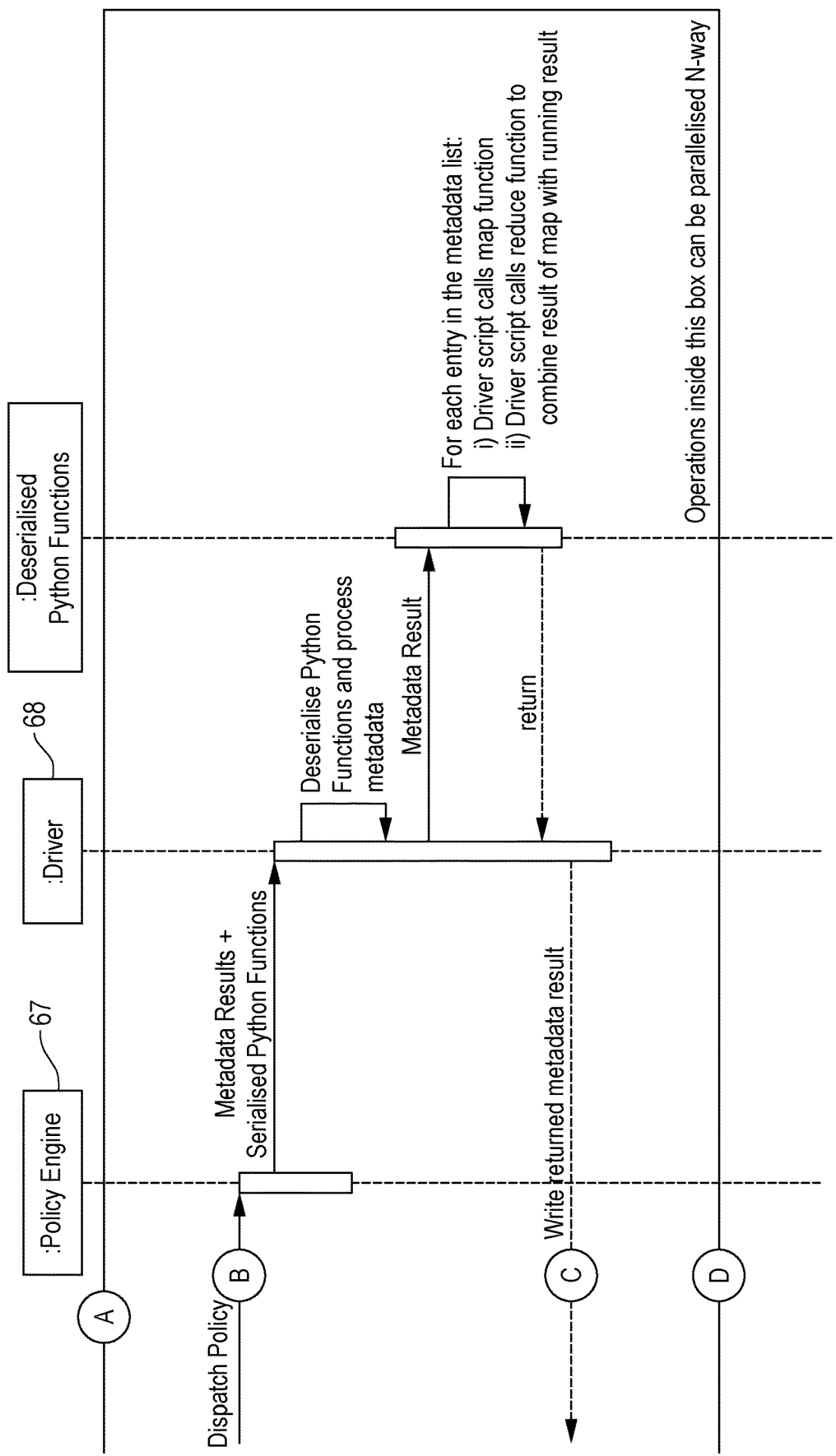
Figure 11:
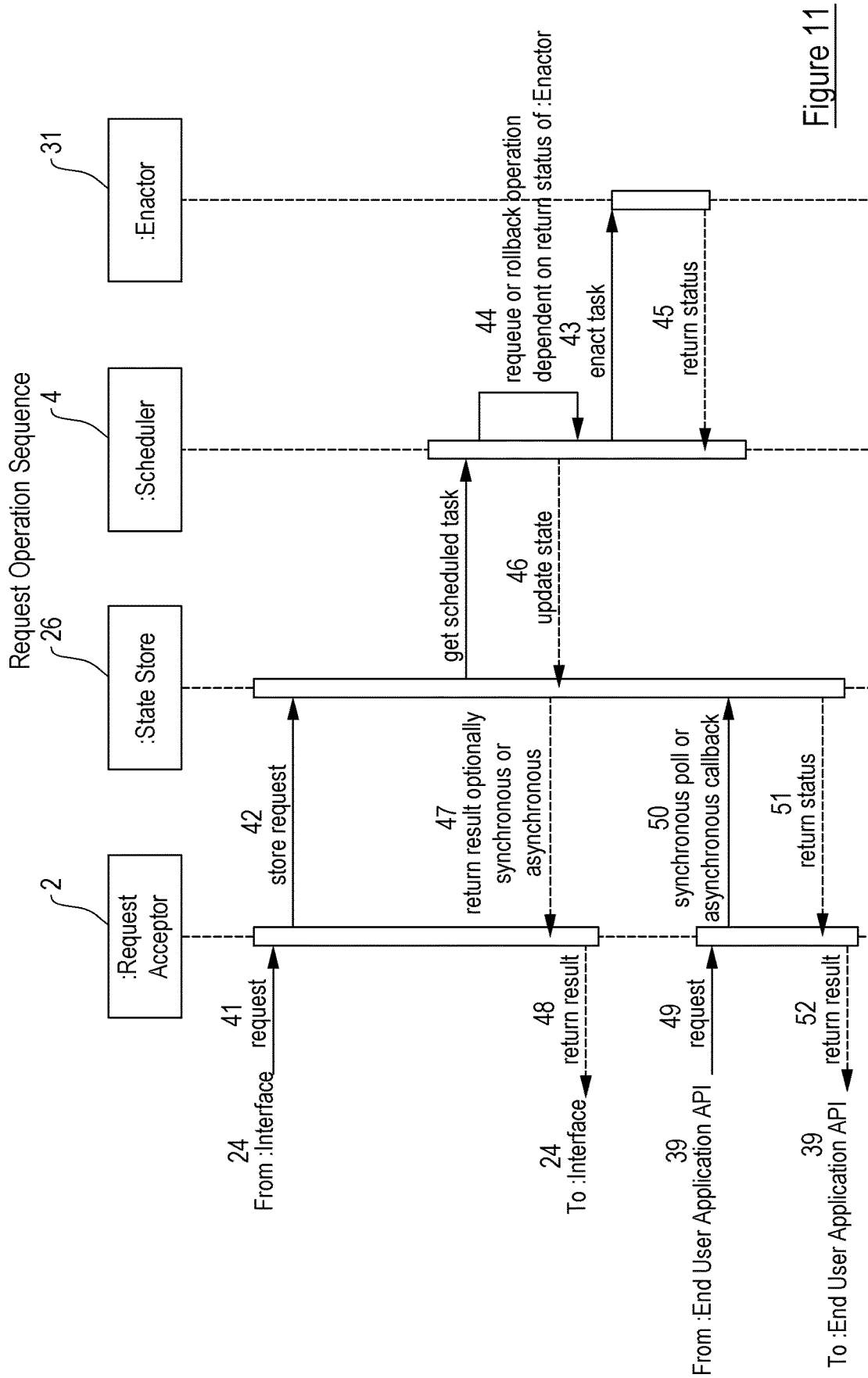

So that the present invention may be more readily understood, embodiments of the present invention will now be described, by way of example, with reference to the accompanying drawings, in which:

FIG. 1 is a schematic diagram showing an overview of the hierarchy of a system of some embodiments, FIG. 2 is a schematic diagram showing an overview of part of a system of some embodiments, FIG. 3 is a flow diagram showing the operation of part of a system of some embodiments, FIG. 4 is a schematic diagram of part of a system of some embodiments, FIG. 5 is a schematic diagram of part of a system of some embodiments, showing a graphical user interface, FIG. 6 is a schematic diagram showing an overview of a system of some embodiments, FIG. 7 is a schematic diagram showing an overview of a system of some embodiments, FIG. 8 is a schematic diagram showing an overview of a system of one embodiments, FIG. 9a is a first part of a sequence diagram showing the operation of some embodiments, FIG. 9b is a second part of the sequence diagram of FIG. 9a, FIG. 10 is a sequence diagram showing the user operation sequence of a system of some embodiments, FIG. 11 is a sequence diagram showing a request operation sequence of a system of some embodiments, and FIG. 12 is a sequence diagram showing the enactment of an operation of a system of some embodiments.

SYSTEM OVERVIEW

Referring initially to FIG. 1 of the accompanying drawings, a data management system 1 of some embodiments comprises a plurality of modules which are configured to interact to manage data stored in a data store. The system 1 comprises a core module which is referred to here as a central control module 2. The central control module 2 is configured to receive a request which, in this embodiment, is a request provided by a graphical user interface (GUI) module 3 that receives an input from a user.

Referring now to FIGS. 1 and 2 of the accompanying drawings, the central control module 2 is, in some embodiments, configured to interact with a task engine module 4 and/or a low level API module 5 to control one or more sub-component modules 6.

The sub-component modules 6 are provided with data storage functionality. The sub-component modules 6 preferably comprise a data store file system implemented in a data storage device or server or a plurality of directly or network-connected data storage devices or servers. In some embodiments, the system comprises a data storage device or server or a plurality of data storage devices or servers that are connected to the system directly via a Serial Attached SCSI (SAS) or Fibre-Channel (FC) interface. In a preferred embodiment, each sub-component module 6 is a data storage server that is configured to store data using an IBM Spectrum Scale™ or General Parallel File System (GPFS). However, systems of other embodiments may utilise a different file system to store data.

In some embodiments, at least one of the sub-component modules 6 is a data store which comprises, but is not limited to, one or more of a tape, a magneto-optical (MO) drive, a digital versatile disc (DVD), an object store, a database or a computer accessible data storage device.

In some embodiments, the central control module 2 is configured as illustrated in FIG. 2 to control a sub-component module 6 directly, such as via the sub-component's 6 command line interface, via the task engine module 4 and/or via the low level API module 5.

The available functionality offered by each sub-component module 6 is reflected upwards through the layers of the data management system 1, increasing in abstraction in each layer. The abstraction provides the capability to extend or replace one or more of the sub-component modules 6 without requiring major architectural changes to the central control module 2, the task engine module 4 or the low level API module 5.

The data management system 1 is preferably agnostic with regard to the hardware upon which it is operating. This enables the data management system 1 to operate using different hardware according to a user's requirements.

The operation of the task engine module 4 will now be described with reference to FIG. 3. The central control module 2 is configured to generate 7 a task which may be in response to an input from a user, an external process or state. The task engine module 4 is configured to accept 8 the task from the central control module 2 and to determine 9 any dependencies of the task on other tasks in order to create a workflow of operations.

The task engine module 4 is configured to process 10 the task such that the task is enacted on one or more of the sub-component modules 6. The task engine module 4 then returns 11 a result to the central control module 2 which is indicative of the enacted task.

In some embodiments, the task engine module 4 is configured to enact the task on the local data management system. In other embodiments, the task engine module 4 is configured to enact the task on one or more remote data management systems 12.

The task engine module 4 provides the data management system 1 with the ability to perform one-off or repeatable functions or tasks. The tasks may be undertaken by one or more data management system depending on the requirements of the task. The performance of the data management system therefore scales linearly with the number of available data management system.

The task engine module 4 of some embodiments is configured to store a plurality of tasks as macros to enable a user to recall, modify or duplicate tasks or workflows at a time in the future.

The task engine module 4 is preferably configured to retry failed tasks until the task completes and schedule the inaction of tasks in order of dependency to minimise or prevent conflicting events and to optimise the operation of the data management system.

The data management system 1 is, in some embodiments, configured to prevent a user from using the task engine module 4 directly. Rather, the data management system 1 is configured to enable a user to use the system via the central control module 2 which ensures the integrity of the state of the system. A user therefore uses the task engine module 4 via the central control module 2 to effect an operation via a higher level component, such as the central control module 2 or the GUI module 3.

Referring now to FIG. 4 of the accompanying drawings, the central control module 2 is, in some embodiments, configured to accept data input and requests from known local or remote external sources. For instance, the central control module 2 is configured to receive a request in the form of a representational state transfer (REST) request 13. The central control module 2 is preferably configured to receive and interpret a request in a semantic REST format.

In other embodiments, the central control module 2 is configured to receive a request or remote procedure call (RPC) 14 from an external source.

The central control module 2 provides an abstracted and consistent implementation across all of the lower level components and modules. This enables the sub-component modules 6 to be swapped out or aggregated, thereby providing an easier route to market for the adoption of new technologies. The different sub-component modules 6 are reflected in the higher level modules, such as the GUI module 3 in a consistent manner. A user can therefore continue to use the data management system 1 consistently with different sub-component modules 6 because the user interaction is via the GUI module 3 which preferably remains consistent regardless of the different sub-component modules 6.

In some embodiments, the GUI module 3 is configured to provide an output to a user which is indicative of the state of the data management system 1. The GUI module 3 can therefore provide a user with an overview of the operation and state of the data management system 1.

Referring now to FIG. 5 of the accompanying drawings, the GUI module 3 is preferably configured to provide an intuitive interface to a user which is separated into three logical functional areas; configuration 15, reporting 16 and action 17. In some embodiments, the functional areas are presented to a user by the GUI module 3 differently depending upon the user's privilege level.

The GUI module 3 presents a user with a view of the hardware components 18 and the software components 19 upon which the system is operating and the state of those components 18, 19.

The configuration view 15 is configured to permit a user to set up and alter the settings of the data management system 1, such as the network, physical storage, local or remote data containers, services and other functions.

The reporting view 16 is configured to provide visual feedback on the state of the data management system 1. The reporting view 16 preferably provides information indicative of the health, tasks and performance matrix of the data management system 1.

The actions view 17 is configured to provide a user with the ability to construct workflows which are enacted via the task engine module 4 and preferably configured to save the workflows as macros for later re-use.

System Architecture

Referring now to FIG. 6 of the accompanying drawings, the data management system 1 is shown in more detail and comprises further modules beyond the modules described above.

The data management system 1 is configured for managing a data store which, in this embodiment is a file system 6. In a preferred embodiment, the file system 6 is a GPFS file system. However, the file system is a different type of data store in other embodiments, such as the data stores described above.

The data management system 1 comprises the central control module 2 which is configured to receive a request 20. The central control module 2 is configured to receive the request 20 from at least one of a client application module 21, a web server 22 or a periodic/calendar based initiator module 23.

The client application module 21 of some embodiments is an end user application programming interface (API) which enables a user to interact with the data management system 1.

The web server 22 of some embodiments is a server which is configured to receive and transmit information from a web user interface module 24. The web server 22 is configured to receive push or pull communication from the web user interface module 24. In some embodiments, the web server 22 is configured for push or pull communication with a rendering module 25 which is configured to generate visual output data which provides a visual indication to a user of the state of the data management system 1.

In some embodiments, the request 20 is a REST compliant request. In some embodiments, the central control module 2 is configured to return REST compliant responses.

In some embodiments, the REST compliant requests and/or responses are semantic REST requests or responses.

Standard REST functionality typically has a one-to-one mapping between functionality and function call. For example, a REST request in the form http://myproduct/create/folder maps directly to the function call "make directory [folder]".

The semantic REST which is preferably used in the system of some embodiments provides abstract programmatical methods which enable the system to infer automatically what tasks it performs and what the attributes or properties are for the task, thereby breaking the one-to-one mapping of conventional REST.

Examples of semantic REST are described on the Internet here: http://restdesc.org/about/descriptions.

The system of some embodiments uses semantic REST requests to map higher order abstract concepts to lower order specific detail, without the requirement for the end user to understand the underlying low level specifics. For example, in some embodiments, the data management system 1 is configured to create a data holding area or space having a predetermined performance characteristic, a predetermined data size characteristic and a predetermined retrievability characteristic. The data management system 1 is configured to interpret these predetermined characteristics and map them onto low level file system operations optimally. The end user is thus not required to interact directly with the low level file system but instead able to input higher level request to control and manage the data management system.

The central control module 2 is, in preferred embodiments, a REST server which is configured to receive requests in a semantic REST format and to return REST compliant responses. In some embodiments, the central control module 2 is configured to receive and/or return extended information, such as semantic REST compliant collection+js data structures.

In embodiments where the central control module 2 is a REST server, the REST server is implemented in server hardware or implemented as a virtual server executing on one or more server hardware components.

In some embodiments, the data management system comprises a plurality of central control modules 2 which are each implemented as a respective REST server. The REST servers are configured to execute in parallel with one another and are preferably configured to communicate with one another so that the functions of the REST servers can be spread across the plurality of REST servers to optimise performance of the data management system.

The central control module 2 is configured to receive requests and translate all requests and/or the underlying operations of each request into a task. The tasks are stored for immediate or subsequent inaction by the system as described below.

The data management system 1 further comprises a state store module 26 which is preferably integrated within the central control module 2. In some embodiments, the state store module 26 is implemented in a database which is coupled to exchange data with the central control module 2. In other embodiments, the state store module 26 is implemented in separate hardware or in a separate virtual environment to the central control module 2.

The state store module 26 is coupled to the central control module 2 and configured to store the tasks generated by the central control module 2. The state store module 26 is further configured to store state information indicative of a state of the data store 6 and is configured to output the stored tasks in response to the state information.

The data management system 1 of some embodiments comprises a plurality of state store modules. The plurality of state store modules are preferably implemented in separate hardware or virtual server environments, thereby providing redundancy protection whereby one of the state store modules can be used if another state store module fails or is otherwise not operational. In some embodiments which incorporate a plurality of central control modules, each central control module is configured to communicate with a plurality of state store modules so that one or more of the central control modules can store tasks in one or more of the state store modules.

In some embodiments, the state store module 26 is configured to store the state of all underlying modules in the data management system in addition to the data store file system 6. For instance, in some embodiments, the state store module 26 is configured to store state information indicative of the state of the task engine module 4 and the low level API module 5 in addition to the data store file system 6.

The state store module 26 is configured to receive task status information 27 from the task engine module 4. The task update information 27 preferably comprises information indicating that a task has been completed which may be indicative of a change in the state of the data store file system 6 and/or other modules in the system. The state store module 26 stores the update information 27 as state information which is indicative of the new state of the system following the inaction of the task.

In some embodiments, the data management system 1 comprises a state monitoring module 28 which is configured to monitor the state of the data store file system 6 and preferably configured to monitor the state of the other modules of the system, such as the task engine module 4 and/or the low level API module 5. The state monitoring module 28 provides state information about the system to the state store module 26 and the state store module 26 stores the state information.

The state information stored by the state store module 26 represents the state of the system and, most notably, the state of the data store file system 6. This distinguishes the data management system 1 from conventional data management system where the state of the data store file system is not stored separately, but is instead derived directly by additionally monitoring the state of the data store file system. The data management system 1 of embodiments of the invention ensures that the state of the data store file system 6 matches the state indicated by the state information stored by the state store module 26 by enacting specific operations to bring the state of the data store file system 6 into conformity with the state indicated by the state information held by the state store module 26.

The state store module 26 is configured to modify or add to the tasks stored by the state store module 26. In some embodiments, this is done in response to the task update information 27 received from the task engine module 4. For example, in some embodiments, the state store module 26 is configured to remove or re-queue a task if the task update information 27 indicates that a failure has occurred. Alternatively, the state store module 26 may be configured to modify or supplement a task by one or more additional tasks based on new information provided by the task update information 27.

The task engine module 4 is configured to receive tasks from the state store module 26 and/or the central control module 2 and to enact the tasks. In some embodiments, the data management system 1 comprises a plurality of task engine modules 4 which are each configured to enact tasks received from one or more state store modules.

The task engine module 4 is configured to enact a task at a predetermined time. In some embodiments, the predetermined time is substantially immediately or at a predetermined time in the future. The task engine module 4 is therefore configured to enact a task within a set predetermined timeslot which may be selected by the task engine module 4 as an optimal time for enacting the task. For instance, the task engine module 4 can enact a task at an appropriate time based on the state information stored by the state store module 26 so that the task is enacted at an optimal time in relation to other tasks that are to be enacted by the system.

In some embodiments, the task engine module 4 is configured to action a task repeatedly or to action tasks in a predetermined order. In further embodiments, the task engine module 4 is configured to prioritise tasks, preferably based on the dependencies and/or relationships of the tasks so that the tasks are enacted in an optimal order by the system to maximise the efficiency of the data management system.

In some embodiments, the data management system 1 comprises a plurality of task engine modules which are each configured to enact tasks. This provides the system with the ability to scale out easily and provides the system with a masterless fault-tolerant architecture.

The data management system 1 further comprises an enactor module which is configured to action a task output from the state store module 26 by generating an enactor output command that at least partly corresponds to the task. When the enactor output command is communicated to the data store file system 6, the enactor output command causes the data store file system 6 to perform an action on data stored in the data store file system 6. The enactor output command can be any kind of command which may be executed by the data store file system 6, such as a command to query the presence of data in the data store or a command to move, copy or delete data stored in the data store file system 6. The enactor command can be any other command or instruction that is required and which may be non-specific to a data store.

In some embodiments, the data store file system 6 comprises a data store server and the state monitoring module 28 is implemented within the data store server. The implementation is, for instance, such that the state monitoring module 28 executes as a daemon on or with access to the data store server or a view of the data store server to monitor the state of the data store server and provide state information to the state store module 26.

The data management system 1 enables all changes to the data store file system 6, and preferably other modules of the system, to be tracked by storing any change requests as tasks in the state store module 26. Tracking the changes in this way provides a robust system which minimises the risk of the data stored by the data store file system 6 being changed or corrupted by unauthorised or untracked change requests.

Referring now to FIG. 7 of the accompanying drawings, a data management system of some embodiments comprises a plurality of central control modules 2a-n, state store modules 26a-n and task engine modules 4a-n. The modules are arranged in layers in a plurality of stacks 29a-n. In this embodiment, each stack 29a-n comprises one central control module 2a-n, one state store module 26a-n and one task engine module 4a-n. However, as discussed below, in some embodiments the stacks 29a-n may be configured differently from one another with one or modules omitted from one or more stacks 29a-n.

It is to be appreciated that in some embodiments there are a greater or fewer number of modules and stacks relative to the number shown in FIG. 7. The reference sign "n" indicates that there could be any number of stacks and modules in a data management system of an embodiment of the invention.

In this embodiment, each stack 29a-n comprises a respective interface module 30a-n. The types of the interface modules 30a-n in each stack may differ from one another. In this embodiment, the first stack 29a comprises an interface module 30a that incorporates a non-graphical user interface, the second stack 29b comprises an interface module 30b that incorporates a graphical user interface and the third stack 29c comprises an interface module 30c that incorporates an end user application programming interface (API).

In this embodiment, each stack 29a-n comprises a respective enactor module 31a-n. The enactor modules 31a-n may be configured to function in the same way as one another or differently.

In this embodiment, the data management system comprises a data store API layer 32 which comprises one or more data store API modules. However, in other embodiments, the data store API layer 32 is omitted.

In this embodiment, each stack 29*a-n* comprises a respective data store module 33*a-n* which is each configured to store data in a file system.

As illustrated by the interconnecting lines in FIG. 7, the modules in each layer of each stack 29*a-n* are preferably configured to communicate with modules in the adjacent layer of each stack 29*a-n*. This enables the system to operate without all modules being functional or present in each stack 29*a-n*. In some embodiments, at least one module from one or more stacks 29*a-n* is omitted but the system is still able to function because an equivalent module in the same layer as the omitted module can function in place of the omitted module.

The plurality of stacks 29*a-n* and the interconnections between modules in each layer provide the data management system of some embodiments with fault tolerance whereby the system can continue to function when one or more of the modules fails or is otherwise not operational. The data management system 1 is therefore capable of being configured as a truly masterless data management system that is fully scalable and fully fault tolerant.

The data management system of some embodiments is an N×N way configuration, fully redundant and scalable to any number of desired modules. Not all modules are required in each layer. For instance, in some embodiments, there may be a greater or lower number of enactor modules 31*a-n* relative to the number of other modules in the system.

Referring now to FIG. 8 of the accompanying drawings, a data management system of one embodiment comprises three interface modules 30*a-c* which are each configured to communicate with a plurality of central control modules 2*a-n*.

Each central control module 2*a-n* is configured to communicate with two state store modules 26*a-b*. Each of the state store modules 26*a-b* is configured to communicate with two task engine modules 4*a-b*. Each of the task engine modules 4*a-b* is configured to communicate with a plurality of enactor modules 31*a-n*. Each of the enactor modules 31*a-n* is configured to communicate with two data store modules 33*a-b*.

The data management system of the embodiments shown in FIG. 8 is an example of an embodiment where there is a greater or lower number of modules in each layer relative to other layers of the system. The communication paths between the modules in the adjacent layers enable the system to continue to function even when one module in a layer is not operational.

The configuration of the data management system with the modules arranged in layers provide higher-order, simplified and increasingly agnostic views and operations on all underlying data file system modules and associated tasks. The central control module 2 and the state store module 26 act as a control layer between the underlying modules and the higher user-facing interface modules. The configuration enables the system to provide a stateful view of all underlying technical components of the system while at the same time maintaining a fully scalable architecture.

The abstraction provided by the layers of the system enables the system to provide a standardised interface which enables end users to develop applications which interact with the interface with minimal API knowledge. For instance, in some embodiments, the system is configured to provide a Collection+JSON Standardised API interface. The higher-order view of the system that is provided to end users ensures that the end users do not need to be experienced in configuring or operating the underlying data storage file system. This makes it easier for end users to develop custom interfaces and data workflows. The data management system of some embodiments enables end users to provide rapid and consistent methods to query data, create/delete/modify data in the underlying file system, build custom interfaces and provide workflow enhancements to current toolsets.

The data management system is technologically agnostic, enabling management of different types of data stores using different technologies. The data management system allows for stateful monitoring of all underlying components. The data management system is preferably a fully scale-out, fault tolerant architecture.

The data management system of some embodiments comprises an authorisation system which is preferably OAuth or OAuth2 compliant.

The configuration of the central control module to convert all requests to tasks and to store the tasks provides a synchronous callback functionality of requested operations. Furthermore, the data management system of some embodiments allows for immediate or deferred scheduling of tasks and permits the use of user-defined plugins.

In some embodiments, the data management system 1 incorporates a GPFS Python API module that is configured to control GPFS. The GPFS Python API module is configured to use the GPFS core tools directly within Python. The GPFS Python API module is a Python compliant library which strongly adheres to Pythonic standards.

The GPFS Python API module enables a user to integrate GPFS operations within their core applications to leverage the ability to extend typical server side data management operations into the user's workflows. For example, an application may create project folders which place data on different performance tiers. Similarly, a snapshot can be performed on data before deletion, all from within the key core applications of a user's workflow. The GPFS Python API module provides a smoother integration path for applications which utilise Python, reducing the need for external code and in turn reducing development time and associated costs.

In some embodiments the GPFS Python API module supports one or more of the following functions:
Dependent and Independent Filesets
Global and per-Fileset Snapshot Creation and Deletion
Active File Management for WAN, LAN and NAS Caching
Policy Creation and Execution
User, Group and Fileset Quotas
Filesystem Operations
Cluster Node Startup and Shutdown
Informational Reporting In some embodiments, the GPFS Python API module is configured to use MapReduce to greatly increase performance of the GPFS policy system. The MapReduce implementation enables the GPFS Python API module to return results in time orders of magnitude less than the default time quoted by IBM™. Specific application of MapReduce to the GPFS Policy system enables the system to provide real-time (as you go) result reporting, as opposed to post-process result reporting. Additionally MapReduce provides the GPFS Python API module provides with the ability to mutate the data returned by the policy in real-time.

In some embodiments, the system is configured to install a GPFS callback within GPFS itself using a serialisation/de-serialisation processes. For instance, the system is configured to convert program code into a computer readable file which is stored within the GPFS environment. This provides fault-tolerance, 'run-anywhere (on any cluster node)' and removes the need to ensure that cluster nodes always has the latest version of a callback script or that it is present on a node.

In some embodiments, the system is configured to limit the callback execution to any individual fileset within GPFS on one or more cluster nodes.

In some embodiments, the data management system 1 comprises a SnapDiff module that is configured to perform a SnapDiff operation. The SnapDiff module is coupled with the GPFS Python API module and is configured to perform the following operations:

1. Take GPFS first snapshot1
2. Make changes to GPFS filesystem data
3. Take second GPFS snapshot2
4. Make changes to GPFS filesystem data
5. Compute file and directory changes, modifications, moves and deletes between snapshot1 and snapshot2
6. Result resultant data set in a Pythonic manner of the user's choice The SnapDiff module is configured to utilise standard GPFS/Spectrum Scale Snapshots to produce a 'Diff'—or a report on the data difference—between two snapshots. The SnapDiff module is configured to track created, deleted, changed/modified and moved files or directories over time.

The SnapDiff module provides fast reporting on scenarios such as data usage, determining 'what has changed' or 'where is'. The SnapDiff module is also preferably configured to determine the optimal data set required for a transfer.

The SnapDiff module is preferably configured to provide the following functionality:
  Determination of created, deleted, changed or moved data
  Data sets can be Global or per-Fileset
  Can be utilised natively by Python or as a standalone utility In some embodiments, the data management system 1 incorporates an APSync module. The APSync module is coupled with the SnapDiff module and the GPFS Python API module and is configured to provide scale out asynchronous replication of data from one GPFS/Spectrum Scale filesystem to a second filesystem which may or may not be of type GPFS/Spectrum Scale.

The APSync module is configured to use the functionality of the SnapDiff module to compute the difference data set providing a minimal 'incremental' list of changes which can then be passed to secondary processes of a user's choice to enact the data transfer in parallel.

The APSync module a scale-out, asynchronous, data replication solution supporting data sets from small to Petascale.

The APSync is configured to provide a consistent method for Disaster Recovery or movement of data from GPFS platforms to other GPFS clusters. Coupled with the GPFS Python API module, the APSync module can be managed standalone or as part of a data pipeline.

The APSync module uses the functionality of the Snap-Diff module to quickly determine the optimal data set to transfer to the remote cluster providing orders of magnitude reduction in backup windows, link usage and resources.

The APSync module preferably supports Full Replication of GPFS ACLs and Extended Attributes (XATTR) in order to provide a 1:1 copy of the original data.

Additionally, the APSync module is preferably configured to deliver data to non-GPFS based clusters. In such scenarios ACL and Extended Attributes will be transferred dependent on the support of such by the non-GPFS cluster.

The APSync module is preferably configured to provide the following functionality:

Utilises differential data points in order to transfer only the required data
Global or per-Fileset data transfer
Transfer via secured SSH or rsync protocol
Full support for GPFS ACL and Extended Attributes
Supports GPFS multi-cluster
Adherence to GPFS nodeclass properties
Per-Node Data Transfer Bandwidth Control
Full logging to a centralised log location The operation of the SnapDiff module and the APSync module will now be described with reference to the sequence diagram shown in FIGS. 9a and 9b. The operation of the SnapDiff and APSync modules utilises the MapReduce implementation of the GPFS Python API module, as discussed above.

It is to be appreciated that the operation shown in FIGS. 9a and 9b preferably occurs in parallel with one or more other operations to maximise the efficiency of the system.

As shown in FIGS. 9a and 9b, the APSync module 64 provides a snapshot identifier to the SnapDiff module 65 which in turn provides the snapshot identifier to the GPFS Python API module 66.

The GPFS Python API module 66 defines a policy and processing rule objects, including Python functions (map+reduce) which process metadata. The GPFS Python API module 66 then converts the Python rule object to a GPFS LIST/EXTERNAL LIST rule pair with the Execution Target being the GPFS API policy driver script and Parameters ('opts') being serialised processing functions.

The GPFS Python API module 66 writes the generated GPFS rule to a GPFS policy file and despatches the policy file to a GPFS policy engine 67, preferably using mmapplypolicy.

The policy engine 67 identifies file metadata and builds lists. In some embodiments, the policy engine 67 builds the lists by calculating a weight for each file based on the size of the file and the type of diff operation. The weight provides a heuristic for predicting the timetaken to take to process the related file. The rational being that different types of operations can take differing amounts of time. For example, "create" requires sending the entire file, which will incur a longer time of operation than "modify" which will only send the parts of the file that have changed.

The weights for each file are added to the total for their immediate parent directory. The directories are then sorted by total weight and divided into N lists in a zig-zag pattern. For instance, for three lists (e.g. 1 2 3 3 2 1 1 2 . . . ), the weights for each directory may be sorted as shown below in Table 1.

TABLE 1

| | | |
|---|---|---|
| 10 | 9 | 8 |
| 5 | 6 | 7 |
| 4 | 3 | 2 |
| | | 1 |
| 19 | 18 | 18 |

Once the policy engine 67 has built the lists, the policy engine 67 provides a driver module 68 with a metadata list and serialised Python processing functions. It is to be appreciated that the policy engine 67 can have multiple instances running in parallel to optimise the efficiency of the system.

The driver module 68 de-serialises the Python processing functions and processes the metadata. It is to be appreciated that the driver module 68 can have multiple instances running in parallel to optimise the efficiency of the system.

The driver module 68 parses the metadata list. For each entry in the metadata list, the driver module 68 calls a map function and calls a reduce function to combine the result of the map with a running result. The driver module 68 then outputs the result from the map reduce processing on the metadata list to a work file.

The work file is returned to the driver module 68 and the policy engine 67 completes the execution. The work file is returned to the GPFS Python API module 66.

The GPFS Python API module 66 searches for work files containing partial results, loads partial results from the work files and uses a reduce function to combine partial results, producing a single final result. The GPFS Python API module 66 then returns the final result to the SnapDiff module 65 and/or the APSync module 64.

It is to be appreciated that the operation sequence shown in FIGS. 9a and 9b may be parallelised in any number of N-way parallel operations.

In some embodiments, the data management system 1 incorporates an Easysearch module. The Easysearch module is configured to provide parallel, scale-out metadata extraction and proxy generation of all known file types in a database to an Elasticsearch Database. Data is thereafter interrogated via a simple to use Web GUI.

The Easysearch module is preferably configured to present data assets as pictorial or textual responses to the end-user based on search terms. Further search filters can be applied based on metadata selection of the returned data set in order to effectively drill-down to the optimal data set.

The Easysearch module is preferably configured to enable search and retrieval of assets based on deep metadata contained within the customer's assets, globally. The Easysearch module is preferably configured to identify assets, the asset's location and provide access irrespective of geographical location or technical platform.

The Easysearch module is preferably configured to provide the following functionality:

Searching of primary metadata of assets (E.G. filename, owner, date)
Searching of deep metadata of assets (E.G. EXIF GPS location of image)
Thumbnail generation for known file types (both image and non-image based)
Image based and textual search
Heuristics for image and object recognition
Metadata filtering to affect the result set
Extensible to support future file formats
Extensible to support de-centralised computation of asset proxies/ingest
Provides high-throughput query of all Nirvana ingested metadata including associated proxies via a standard scale-out architecture based on ELK stack components.
Parallel queue based mechanisms for monitoring Nirvana database and proxy generation with refresh mechanisms.
Provides all encompassing global search across a customer's assets, globally A method of operating the user interface will now be described with reference to FIG. 10. A user 34 inputs a request 35 to the user interface module 24. The request 35 may be any kind of request, such as a request to view the state of the system or to modify the underlying file system. The user interface module 24 sends the request 35 with a valid authentication token 36 to the central control module 2. The central control module 2 preferably returns a result 37 to the user interface module 24. The user interface module 24 then preferably updates the user interface to provide updated information about the system to the user 34.

It is to be appreciated that requests can be handled by the system synchronously or asynchronously via callbacks.

In the example method shown in FIG. 10, a request with a valid authentication token 38 may be communicated from an end user API 39 directly to the central control module 2. Again, this request may be handled by the system synchronously or asynchronously via callbacks. The central control module 2 then preferably returns a result 40 to the end user application API 39.

It is to be appreciated that, in some embodiments, all stages in the sequence diagram shown in FIG. 10 may be multiples. For instance, there may be any number of N incarnations of each stage in an embodiment in which the system is configured as an N×N-way full Highly Available architecture.

The data management system of some embodiments comprises an authentication system to enable an authorised user to use the system or to prevent an unauthorised user from using the system. The authentication system is preferably based on an OAuth protocol, such as OAuth2. The system preferably uses a token with an expiry date to permit a user to use the system while the token is valid. Once the token has expired, the system is preferably configured to re-authorise a user before the user can continue to use the system.

A method of operation of a data management system of some embodiments for handling request operations will now be described with reference to FIG. 11.

The central control module 2 receives a request 41 from the interface 24. The central control module 2 interprets the request 41 as a task 42 which is stored in the state store module 26. The state store module 26 passes the scheduled task to the task engine module 4 which either enacts the task 43 at an enactor module 31 or re-queues/rollbacks 44 operation of the task depending on the status of the enactor module 31.

Once the enactor module 31 has enacted the task, the enactor module 31 returns a status 45 to the task engine module 4. The task engine module 4 then provides a state update 46 to the state store module 26 which stores the updated state of the system. The state store module 26 then preferably returns a result 47 synchronously or asynchronously to the central control module 2 which, in turn, preferably returns a result 48 to the interface 24.

In this embodiment, the central control module 2 is configured to receive a request 49 from the end user application API 39 and to provide a synchronous poll or asynchronous callback 50 to the state store module 26. The state store module 26 provides a return status 51 to the central control module 2. The central control module 2 then returns a result 52 to the end user application API 39.

The enactment of an operation and/or state change sequence will now be described with reference to FIG. 12. In operation of the system, the enactor module 31 receives a task 53 from the task engine module 4. The enactor module 31 is configured to enact 54 a data store operation via a data store API 55. The data store API is configured to affect or modify the data store state of the underlying data store 56. The data store 56 is preferably configured to return a result 57 to the data store API 55. The data store API 55 preferably returns a result 58 to the enactor module 31 which, in turn, returns a result 59 to the state store module 26.

If the task 53 requires a generalised action 60 to be performed, the enactor module 31 enacts the action to form the generalised action 60 in an operation 61 and a result 62 is returned to the enactor module 31.

In operation of the system, the data store 56 is preferably configured to monitor the state of the data store and provide a state update 63 continually or periodically to the state store module 26 so that the state store module 26 accurately stores the state of the data store 56.

In the present specification "comprise" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A data management system for managing a data store, the system comprising:
    a data store implemented in at least one data storage device or server; and
    a system stack which communicates with the data store, wherein the system stack comprises:
        a central controller which receives a request and generates a task using the request;
        a state store coupled to the central controller, wherein the state stores the task generated by the central controller;
        a task engine which receives tasks from the state store and enacts the tasks, wherein the task engine prioritises tasks based on the dependencies and relationships of the tasks so that the tasks are enacted in an optimal order to maximise the efficiency of the data management system;
        a state monitor which monitors the state of the data store and provides state information indicative of a state of the data store to the state store, wherein the state store stores the state information and any changes to the data store as tasks and outputs the stored task in response to the state information; and
        an enactor which actions the task output from the state store by generating an enactor output command that at least partly corresponds to the task which, when communicated to the data store, causes the data store to perform an action related to data stored in the data store,
    wherein the data management system ensures that the state of the data store matches the state indicated by the state information stored by the state store by enacting specific operations to bring the state of the data store into conformity with the state indicated by the state information stored by the state store.

2. The system of claim 1, wherein the central controller operates statelessly.

3. The system of claim 2, wherein the central controller is a Representational State Transfer (REST) server.

4. The system of claim 1, wherein the system further comprises:
    a scheduler which causes the enactor to action the task at a predetermined time.

5. The system of claim 4, wherein the scheduler prioritises a plurality of tasks so that the tasks are actioned by the enactor in a predetermined order.

6. The system of claim 4, wherein the state store stores state information indicative of the state of the scheduler.

7. The system of claim 1, wherein the data store stores the state information and provides the state information to the state store.

8. The system of claim 1, wherein the data store comprises at least one of a file system, a tape, a magneto-optical (MO) drive, a digital versatile disc (DVD), an object store, a database or a computer accessible data storage device.

9. A distributed data management system comprising a plurality of data management systems, at least one of the plurality of data management systems being a data management system comprising:
    a data store implemented in at least one data storage device or server; and
    a system stack which communicates with the data store, wherein the system stack comprises:
        a central controller which receives a request and generates a task using the request;
        a state store coupled to the central controller, wherein the state stores the task generated by the central controller;
        a task engine which receives tasks from the state store and enacts the tasks, wherein the task engine prioritises tasks based on the dependencies and relationships of the tasks so that the tasks are enacted in an optimal order to maximise the efficiency of the data management system;
        a state monitor which monitors the state of the data store and provides state information indicative of a state of the data store to the state store, wherein the state store stores the state information and any changes to the data store as tasks and outputs the stored task in response to the state information; and
        an enactor which actions the task output from the state store by generating an enactor output command that at least partly corresponds to the task which, when communicated to the data store, causes the data store to perform an action related to data stored in the data store,
    wherein the data management system ensures that the state of the data store matches the state indicated by the state information stored by the state store by enacting specific operations to bring the state of the data store into conformity with the state indicated by the state information stored by the state store.

10. The distributed data management system of claim 9, wherein the plurality of data management systems each manage data stored in the same data store.

11. The distributed data management system of claim 9, wherein the central controller of each of the plurality of data management systems receives state information from the state store of at least one of the other data management systems.

12. A method of managing a data store, the data store being implemented in at least one data storage device or server, wherein the method comprises:
    receiving a request at a central controller;
    generating at the central controller a task using the request;
    storing the generated task at a state store which is coupled to the central controller;
    receiving tasks at a task engine from the state store;
    prioritising the tasks using the task engine based on the dependencies and relationships of the tasks and enacting the tasks in an optimal order to maximise the efficiency of the method of managing the data store;
    monitoring using a state monitor the state of the data store;

providing state information indicative of the state of the data store to the state store;

storing the state information at the state store and any changes to the data store as tasks;

outputting the stored task from the state store module in response to the state information;

enacting the task using an enactor by generating an enactor output command that at least partly corresponds to the task which, when communicated to the data store, causes the data store to perform an action on data stored in the data store; and ensuring that the state of the data store matches the state indicated by the state information stored by the state store by enacting specific operations to bring the state of the data store into conformity with the state indicated by the state information stored by the state store.

13. The method of claim 12, wherein the central controller operates statelessly.

14. The method of claim 13, wherein the central controller is a Representational State Transfer (REST) server.

15. The method of claim 12, wherein the method further comprises:

enacting the task at a predetermined time in response to an output from a scheduler.

16. The method of claim 15, wherein the method comprises prioritising a plurality of tasks so that the tasks are actioned by the enactor in a predetermined order.

17. The method of claim 12, wherein the method comprises executing the state monitor as a daemon on a data store server or on an additional server with access to the data store server or with access to a view of the data store server.

18. The method of claim 12, wherein the method comprises storing state store information at the data store; and providing the state information to the state store.

19. The method of claim 12, wherein the method further comprises:

receiving an input from a user at a user interface; and communicating the input as a request to the central controller.

20. The method of claim 12, wherein the data store comprises at least one of a file system, a tape, a magneto-optical (MO) drive, a digital versatile disc (DVD), an object store, a database or a computer accessible data storage device.

* * * * *